United States Patent Office 3,533,151
Patented Oct. 13, 1970

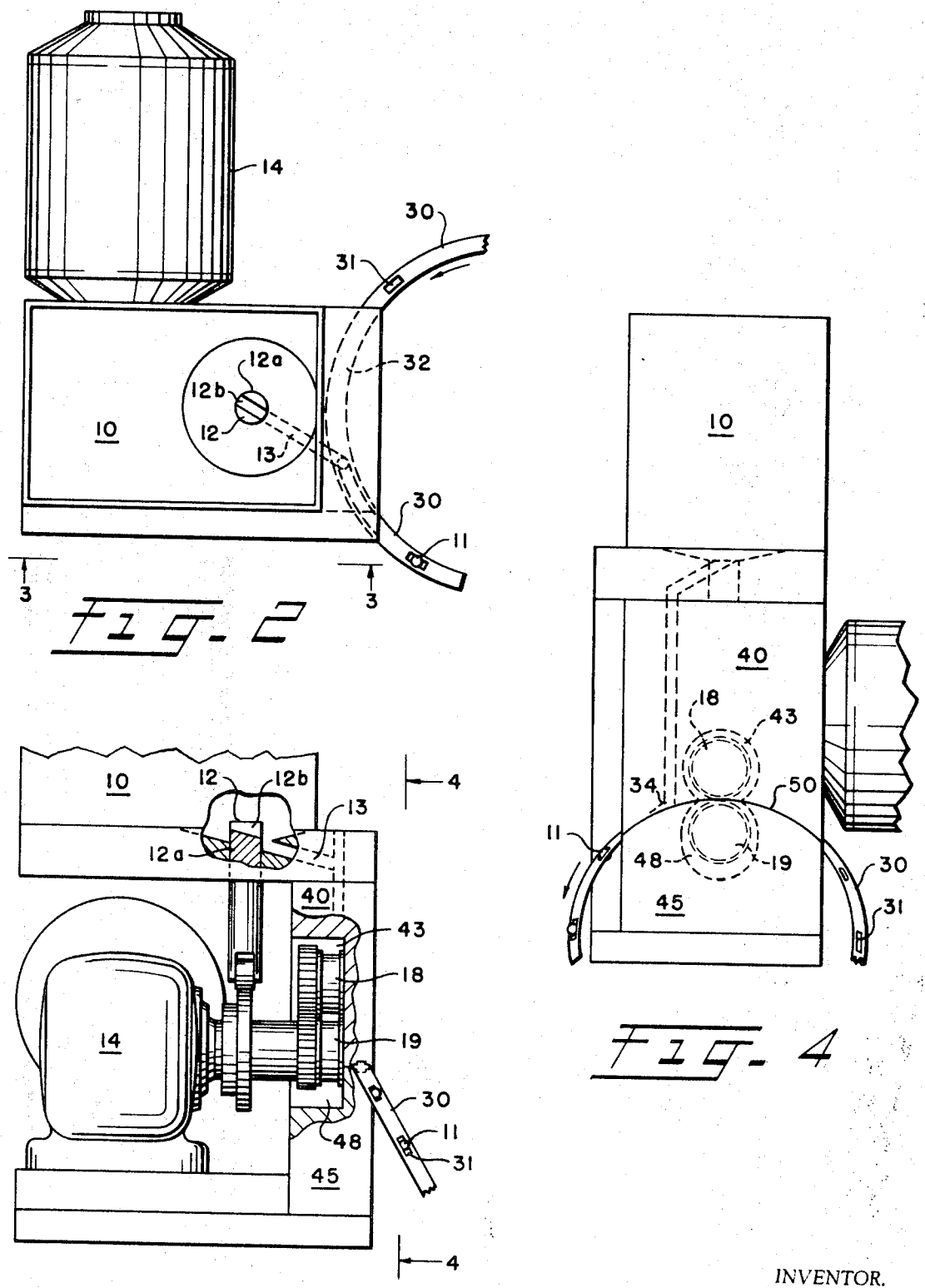

3,533,151
APPARATUS FOR INSERTING BALLS IN A
BALL BEARING RETAINER
Paul E. Gaudry, Laval des Rapides, Quebec, Canada, assignor, by mesne assignments, to Consolidated Foods Corporation, Chicago, Ill., a corporation of Maryland
Filed Nov. 2, 1967, Ser. No. 680,087
Int. Cl. B23p 19/04
U.S. Cl. 29—201
6 Claims

ABSTRACT OF THE DISCLOSURE

Apparatus which includes a hopper containing a supply of bearing-balls to be inserted in a bearing retainer ring, also known as a ball cage, having a series of ball receiving apertures; the balls, which are randomly arranged in the hopper, are extracted from the hopper one at a time and arranged in tandem in a passage by a reciprocating agitator; the bearing retainer ring is fed through a suitably configured channel of the apparatus by feed rollers, and at an intersection of the ball containing passage and the retainer channel, the balls are inserted in a retainer aperture by gravity, and as the retainer ring moves beyond this intersection a ball is pushed fully into the associated aperture in which it is then held.

BACKGROUND OF THE INVENTION

The field of art to which the invention pertains is apparatus for the assembly of a ball bearing consisting of a ball retainer ring or cage having apertures for receiving the bearing balls.

The apparatus according to the subject invention is particularly adapted for inserting bearing balls in a retainer of the type disclosed in copending application Ser. No. 647,378 filed June 20, 1967, now Pat. No. 3,469,272.

SUMMARY OF THE INVENTION

The primary object of this invention is to provide inexpensive apparatus, which is reliable in operation, for the assembly of a ball bearing in which the retainer or cage consists of a molded, discontinuous, frusto-conical ring of synthetic material having a plurality of configured apertures which are particularly configured and dimensioned for confining the bearing balls in the retainer so that they are free to rotate.

A further object of the invention is to provide a machine according to the above object which automatically performs the required assembly, it being necessary only to insert the retainer ring in the apparatus and remove the finished assembly therefrom.

The foregoing objects and additional objects and advantages of the invention will become apparent from the following detailed description of the drawing illustrating a presently preferred embodiment.

BRIEF DESCRIPTION OF THE DRAWING

FIG. 2 is a top plan view of a presently preferred embodiment of the invention.

FIG. 3 is a side elevation viewed in the direction of arrow III of FIG. 2 and partly broken away.

FIG. 4 is an end elevation viewed in the direction of arrow IV in FIG. 3.

DESCRIPTION OF PREFERRED EMBODIMENT

Figure 1:
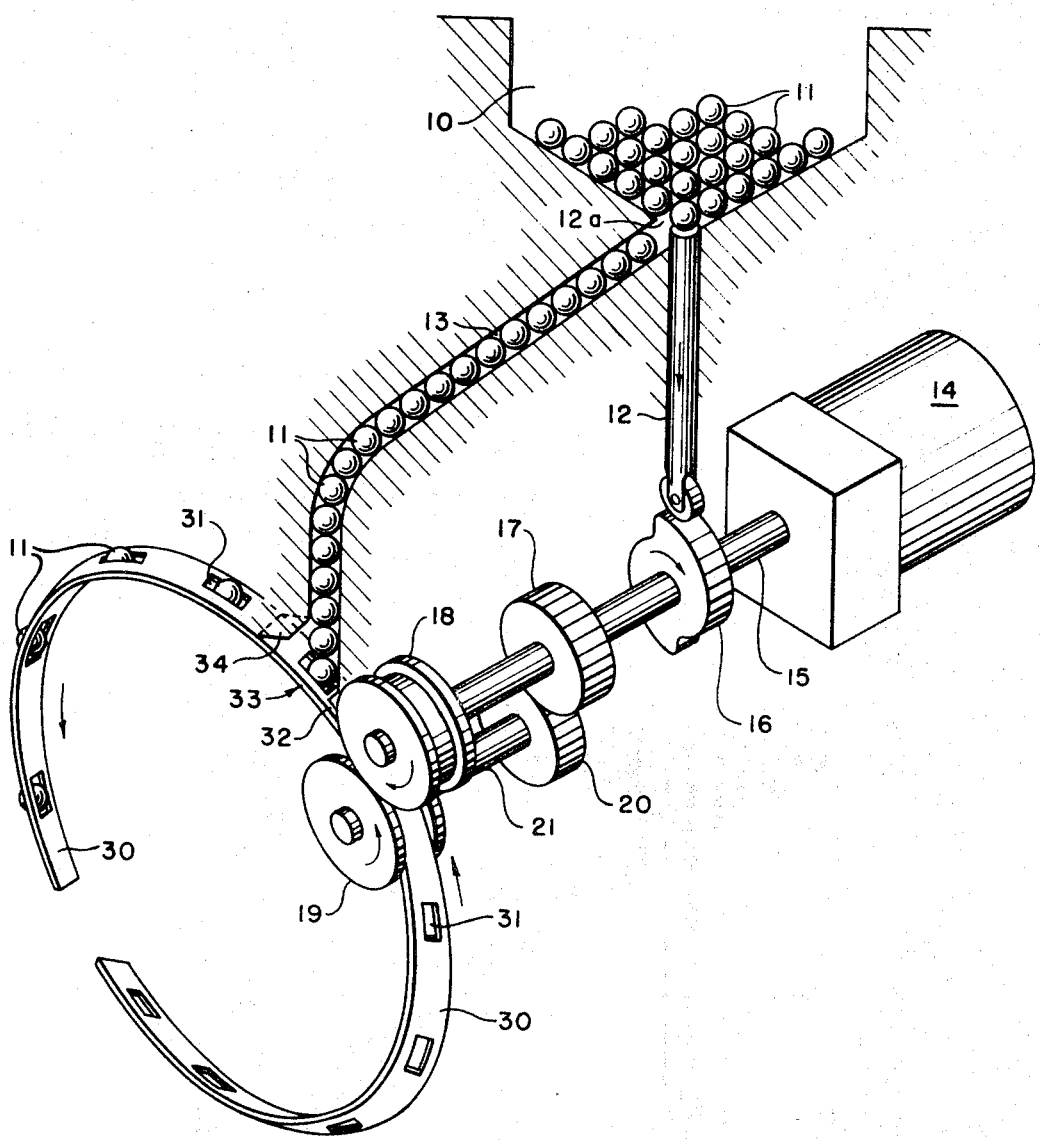
FIG. 1 is a schematic illustration of apparatus according to the invention.

Apparatus according to the invention, and shown schematically in FIG. 1, comprises a hopper 10 containing a quantity of randomly arranged bearing balls 11. A reciprocating plunger 12 enters the hopper through an opening 12a for agitating the balls in the hopper and when the plunger is at the bottom of its stroke a ball is passed into a ball passage 13. When the passage 13 is full the plunger 12 merely keeps the balls in the hopper agitated since the balls enter into passage 13 by gravity only when space is available.

The moving parts of the apparatus are driven in any suitable manner, such as a well known ratio motor 14 connected to a main shaft 15. An agitator cam 16 carried by the shaft 15 is coupled to the agitator 12, as is well known, for imparting reciprocal motion thereto. The shaft 15 also drives spur gear 17 and a feed roller 18 which are connected to this shaft. The complementary feed roller 19 is driven via shaft 21 or any suitable known arrangement such as by spur gear 20, meshed with the driven spur gear 17.

The feed rollers 18, 19 frictionally engage opposite sides of a ball cage 30 which is a discontinuous frustoconically shaped member of molded synthetic material having configured apertures 31 in which the balls 11 are retained. The ball bearing assembled by the apparatus of this invention is disclosed in detail in copending application Ser. No. 647,378 filed June 20, 1967, now Pat. No. 3,469,272. The ball cage 30 is guided through a channel 32 which intersects the ball passage 13 at 33. As the cage 30 is moved through the space 33 by the feed rollers 18, 19 a ball drops partially into an aperture 31 and is carried along with the moving cage 30. The balls which are picked up in space 33 by the cage apertures are not fully inserted in the associated aperture until the inclined wall 34 engages the ball and pushes it into its aperture. As shown in FIGS. 2–4 the ball cage 30 is positioned in the horizontal plane when it passes through the space 33 and the apertures are so dimensioned that a ball is partly received in an aperture sufficient for it to be carried along by the cage. Further, the cage channel is inclined in a downwardly direction in the vicinity of space 33 so that gravity assists movement of a ball partially inserted in an aperture of the ball cage 30. By suitably shaping and dimensioning the balls defining space 33 a ball in this space is constrained to remain in an aperture of the cage while being seated by the inclined surface 34.

The apparatus as described above in connection with FIG. 1 will facilitate the following description of the apparatus as presently contemplated and shown in FIGS. 2–4.

Figure 5A:
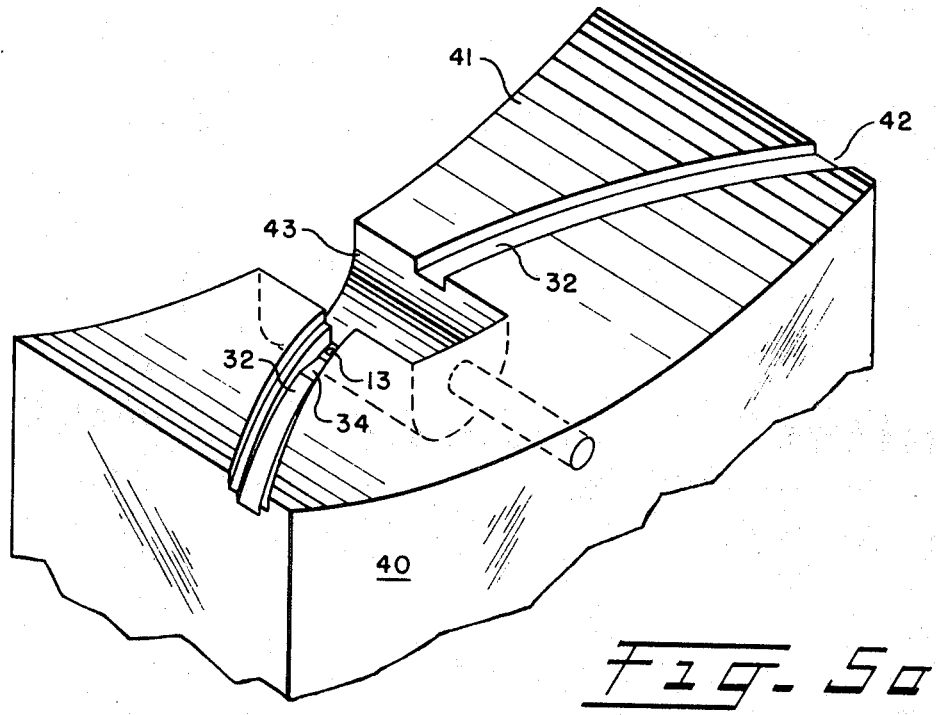
FIGS. 5a, 5b are perspective views of the guide plates of the apparatus of FIGS. 2–4.
Figure 5B:
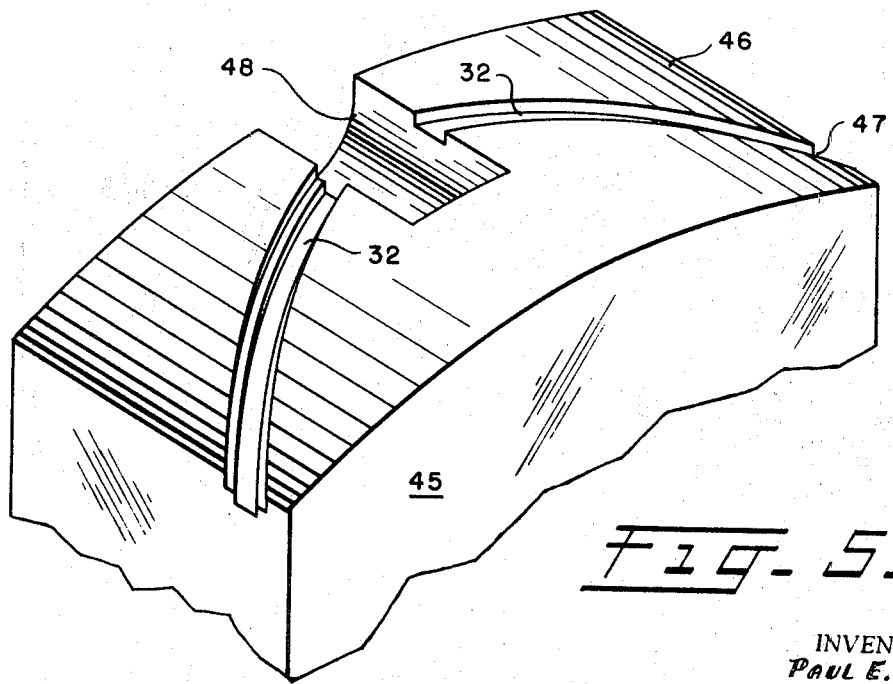

FIG. 2 is a view looking down into the hopper 10 which is empty in this view. The agitator 12 and opening 12a are located at the apex of a conical depression in the bottom of the hopper as seen and plunger 12 is provided with a slot 12b in the head of the plunger. The slot 12b is inclined as shown in FIG. 3, and is wide enough to freely receive a ball. At top dead center of the stroke of plunger 12 the slot 12b closes off passage 13, and at the bottom of the plunger's stroke the slot 12b is coextensive with the ball passage 13. As seen in FIG. 2 the cage channel 32 is semicircular in the horizontal plane and as seen in FIGS. 4 and 5 the channel 32 is also semicircular in the vertical plane as indicated by line 50 (FIG. 4). As best seen in FIGS. 5a and 5b the cage channel 32 is formed by a pair of blocks; an upper cage block 40 (which is shown inverted in FIG. 5a) has a concave semicircular surface 41 in which a semi-circular groove 42 is machined, and a lower guide block 45 which has a matching convex semicircular surface 46 i.e. surfaces 41 and 46 have the same radius of curvature as indicated in FIG. 4 by line 50. The lower guide block 45 also has a semicircular groove 47 having the same radius of curvature as the groove 42 of the upper guide block 40 so that when the blocks 40, 45 are positioned as shown in FIG. 4 surfaces 41, 46 abut one another and the grooves 42, 47 are coextensive and in overlying relation to define the cage guide channel 32. The upper block 40 is suitably recessed to provide a well 43 for feed roller 18 and the lower guide block is also provided with a feed roller well 48 for the feed roller 19.

In operation of the apparatus shown in FIGS. 2–4 a ball cage 30 is inserted into the channel 32 from the right side as viewed in FIG. 4 until it engages the feed rollers. The cage will then be automatically moved through the channel and as the cage apertures move through the intersection of the channel 32 and passage 13, a ball is picked up and fully inserted in the cage aperture by the inclined surface 34. When the cage emerges from the left side of the apparatus as seen in FIG. 4 each of the apertures will contain a bearing ball 11. As soon as the end of the first cage disappears into the channel 32 at the right side entry another cage is fed in so that it will eject the first cage. If the first cage is removed before the second cage is inserted the bearing balls will run out of the channel at the exit end (left side in FIG. 4).

If desired this can be overcome by placing a gate (not shown) in space 33 that opens passage 13 when a cage enters this space and closes passage 13 when the space 33 is unoccupied.

It will be apparent to those skilled in the art that the drive arrangement for reciprocating the ball agitator 12 and rotating the feed rollers 18, 19 may be varied from that disclosed above and that a variety of other changes may be made. The foregoing therefore is given by way of example only and the subjoined claims are not intended to be restricted to the exact arrangement discussed above and shown in the drawing.

What is claimed is:

1. Apparatus for assembling a ball cage having a series of ball receiving apertures and a plurality of bearing balls to be inserted in said apertures, comprising means defining a channel having a radius of curvature in both a horizontal and a vertical plane, means interposed in said channel for feeding said ball cage through said channel, means for supplying bearing balls into said channel, and means in said channel for sequentially inserting said bearing balls into said apertures in the ball cage.

2. Apparatus according to claim 1 wherein said means defining said channel comprises a first member having a convex surface and a second member having a matching concave surface, a curved groove in each of said convex and concave surfaces having a common radius of curvature and being coextensive, said first and second members being joined with said convex and concave surfaces defining an interface therebetween.

3. Apparatus according to claim 2 wherein said means interposed in said channel for feeding said ball cage comprises a well in each of said first and second members opening into said channel, each said well receiving a driven feed roller member, a segment of each said roller member intersecting said channel for egaging opposite sides of said ball cage.

4. Apparatus according to claim 1 wherein said means for supplying bearing balls into said channel comprises a hopper for containing a quantity of balls, an outlet in said hopper, means connected with said hopper for agitating said balls, a member connected with said hopper having a ball passage for communicating said hopper outlet and said channel, said ball passage opening into said channel in a plane substantially normal to said channel, said hopper and ball passage being disposed relative to said channel for gravitationally feeding said bearing balls into said channel.

5. Apparatus according to claim 1 wherein said means for sequentially inserting a bearing ball in said apertures in the ball cage comprises an inclined wall adjacent said means for supplying bearing balls into said channel, said inclined wall pushing a bearing ball into said cage as the cage is moved through said channel.

6. Apparatus according to claim 4 wherein said means for agitating said balls comprises a reciprocal plunger having a head portion operatively associated with said outlet; said plunger in top dead center position obstructing said outlet passage, an inclined slot in the head of said plunger for passing a single ball through said hopper outlet in the bottom dead center position of said plunger.

References Cited

UNITED STATES PATENTS 2,995,809  8/1961  Riedel _____ 29—201

THOMAS H. EAGER, Primary Examiner

U.S. Cl. X.R.

29—148.4